United States Patent [19]

Huret

[11] 4,362,523
[45] Dec. 7, 1982

[54] DERAILLEUR FOR A CYCLE

[75] Inventor: Rogert H. M. Huret, Nanterre, France

[73] Assignee: Huret & Ses Fils, Nanterre, France

[21] Appl. No.: 174,345

[22] Filed: Jul. 31, 1980

[30] Foreign Application Priority Data

Aug. 8, 1979 [FR] France .................. 79 20329
Jun. 27, 1980 [FR] France .................. 80 14316

[51] Int. Cl.³ ............................................. F16H 7/22
[52] U.S. Cl. .................................................... 474/82
[58] Field of Search .......................................... 474/82

[56] References Cited

U.S. PATENT DOCUMENTS 4,030,375  6/1977  Nagano ................... 474/82
4,061,048 12/1977  Huret et al. ............. 474/82
4,274,828  6/1981  Huret ...................... 474/82

Primary Examiner—Allan D. Herrmann
Attorney, Agent, or Firm—Trexler, Bushnell & Wolters, Ltd.

[57] ABSTRACT

The derailleur comprises a finger member which bears on a cam surface. The finger member is carried by an arm of a parallelogram structure. The cam surface is provided on the support of the derailleur. Preferably, the cam achieves a tri-dimensional guiding of the finger member which carries a rotary roller.

12 Claims, 14 Drawing Figures

DERAILLEUR FOR A CYCLE

DESCRIPTION

The invention relates to a derailleur for a cycle.

It is known that the portion of chain between the chain guide pulley and the sprocket of the free wheel of the rear wheel of the cycle must be as short as possible so as to obtain a maximum of rapidity and precision when passing the chain from one sprocket of the free wheel to the other.

For this purpose, various types of derailleurs have been designed, among which some provide a positive control which ensures the rearward travel of the chain guide roller relative to the free wheel as this roller moves laterally toward the sprockets of larger diameter of this free wheel.

In one of these known structures, it has thus been arranged to dispose the deformable parallelogram controlling the derailleur in an inclined position relative to its support lug and relative to the support yoke of the chain guide roller and of the tension roller for the chain so that the plane of the deformable parallelogram is substantially oriented to be parallel to a plane tangent to the free wheel.

In another known structure, a lever is placed between one of the arms of the deformable parallelogram and the support lug of the derailleur, the derailleur being in this case pivotally mounted on its support lug.

However, these two known structures have drawbacks and in particular the first embodiment concerns a derailleur in respect of which the inclination of the deformable parallelogram is determined for optimal operation with a free wheel of given diameter, which necessitates the changing of the derailleur when it is desired to change the free wheel.

The second embodiment must be considered as being little precise owing to the play existing in the articulations of the lever on the arm of the parallelogram and on the yoke, which play is necessary in order to permit the lever to move in a plane which is different from that of the plane of deformation of the deformable parallelogram.

Further, this last mentioned embodiment is fragile.

The present invention has in particular for object to overcome these drawbacks and in particular to provide a derailleur which ensures in a positive precise and simple manner the control of the support yoke of the chain guide roller and of the chain tension roller in such manner that this chain guide roller is situated at a short distance from the sprockets of the free wheel, irrespective of the sprocket employed, this derailleur being moreover capable of being rapidly adapted in accordance with the diameter of the sprockets of this free wheel. For this purpose, the invention concerns a derailleur for a cycle mainly comprising a support and a deformable parallelogram structure which is deformable under the action of a traction cable, one of the sides of the parallelogram structure being pivoted to the support whereas its opposite side supports a yoke provided with a chain guide roller and a chain tension roller, these two opposite sides being connected in an articulated manner by two parallel arms defining the two other sides of the deformable parallelogram structure, this derailleur being characterized in that it comprises a finger member which bears on a cam surface, said finger member and said cam surface being respectively carried one by an arm of the parallelogram structure and the other by the support.

According to other features of the invention:

the member defining the cam surface is pivotally mounted on the support by means of a pin, this pivoting being limited by an abutment;

the pivot axis of said member is formed by the pin pivotally mounting the side of the parallelogram structure on the support;

said member carries an abutment for a sheath of the control cable;

the cam has a profile so adapted as to afford a tridimensional guiding of the roller and means are provided for reducing the friction between these two members.

Preferably, the finger member carries a rotary roller. This roller may, for example, have the shape of a truncated cone or a spherical ring.

The invention is shown by way of a non-limitative example in the accompanying drawings in which.

Figure 8:
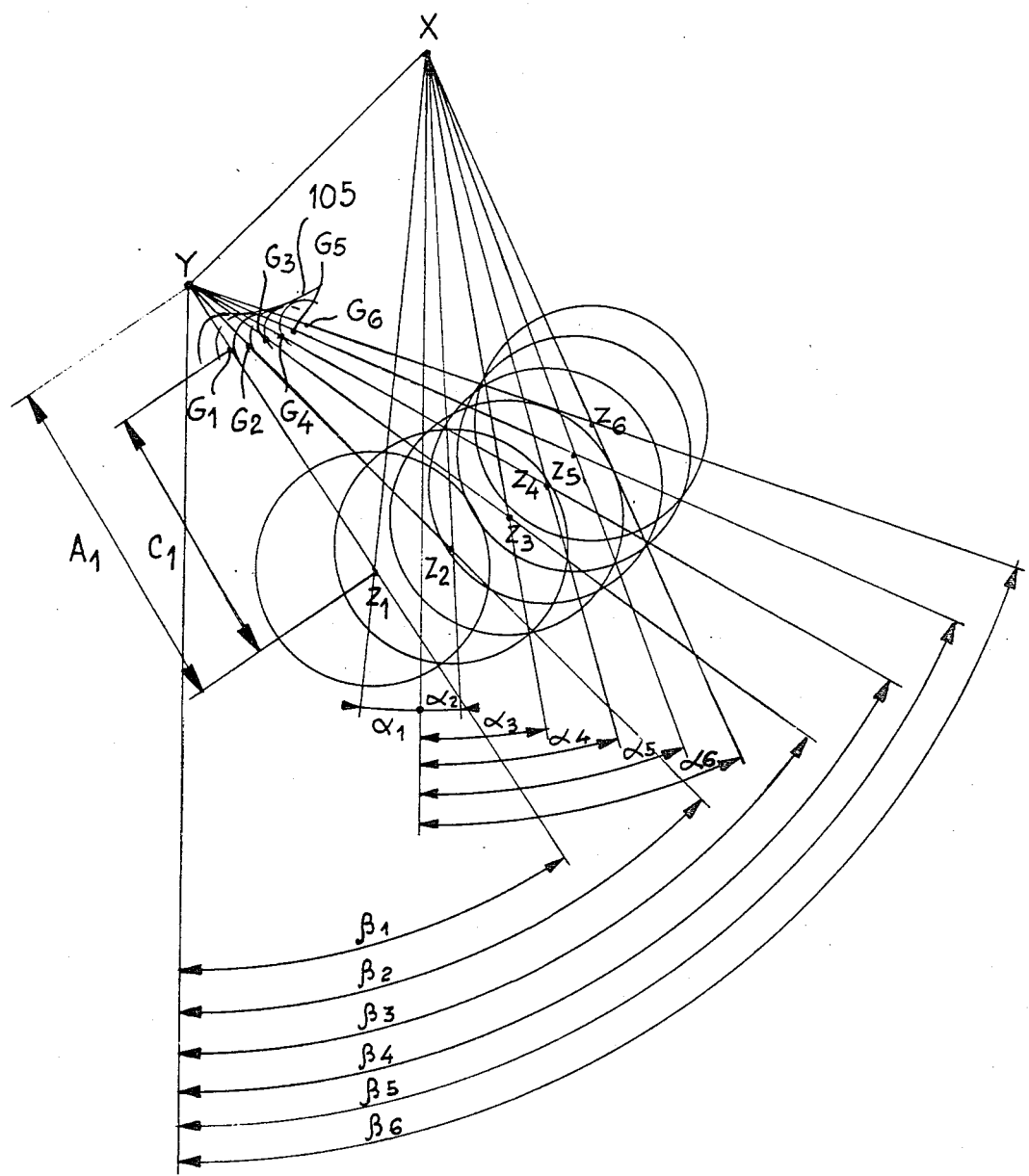
Figure 9:
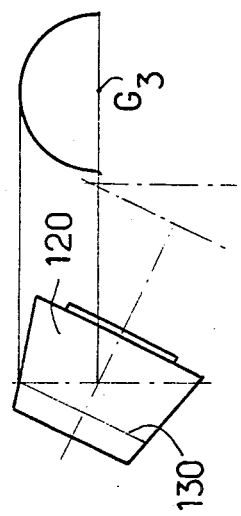
Figure 10:
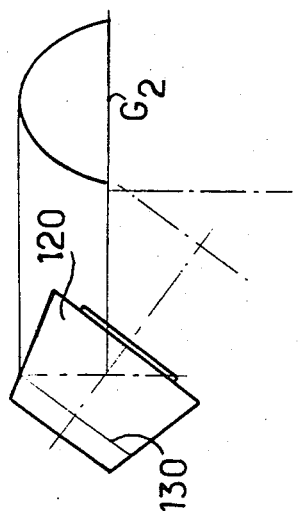
Figure 11:
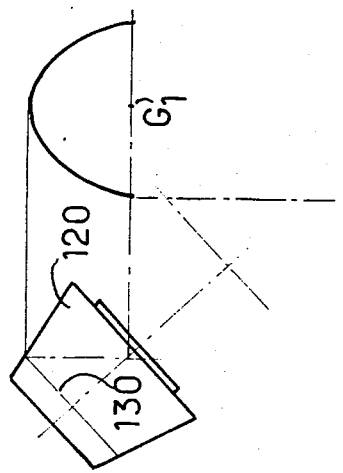
Figure 12:
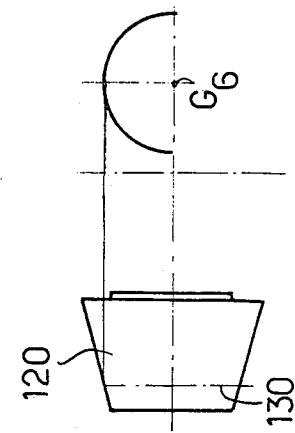
Figure 13:
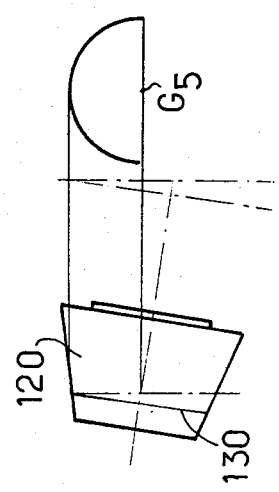
Figure 14:
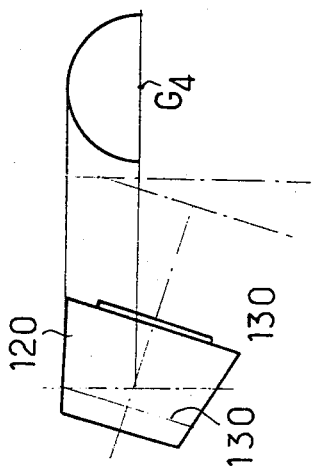

FIG. 8 is a diagram showing one embodiment of the profile of the cam projected onto a plane perpendicular to the axis of the wheel, and FIGS. 9 to 14 are diagrams showing the positions of the roller for the successive positions of the derailleur and in particular for providing a derailleur which ensures in a simple, precise and positive manner, the control of the support yoke of the chain guide roller and of the chain tension roller in such manner that this chain guide roller is located at a short distance from the sprockets of the free wheel, irrespective of the sprocket employed, it being possible moreover to adapt this derailleur rapidly in accordance with the diameter of the sprockets of this free wheel.

Figure 1:
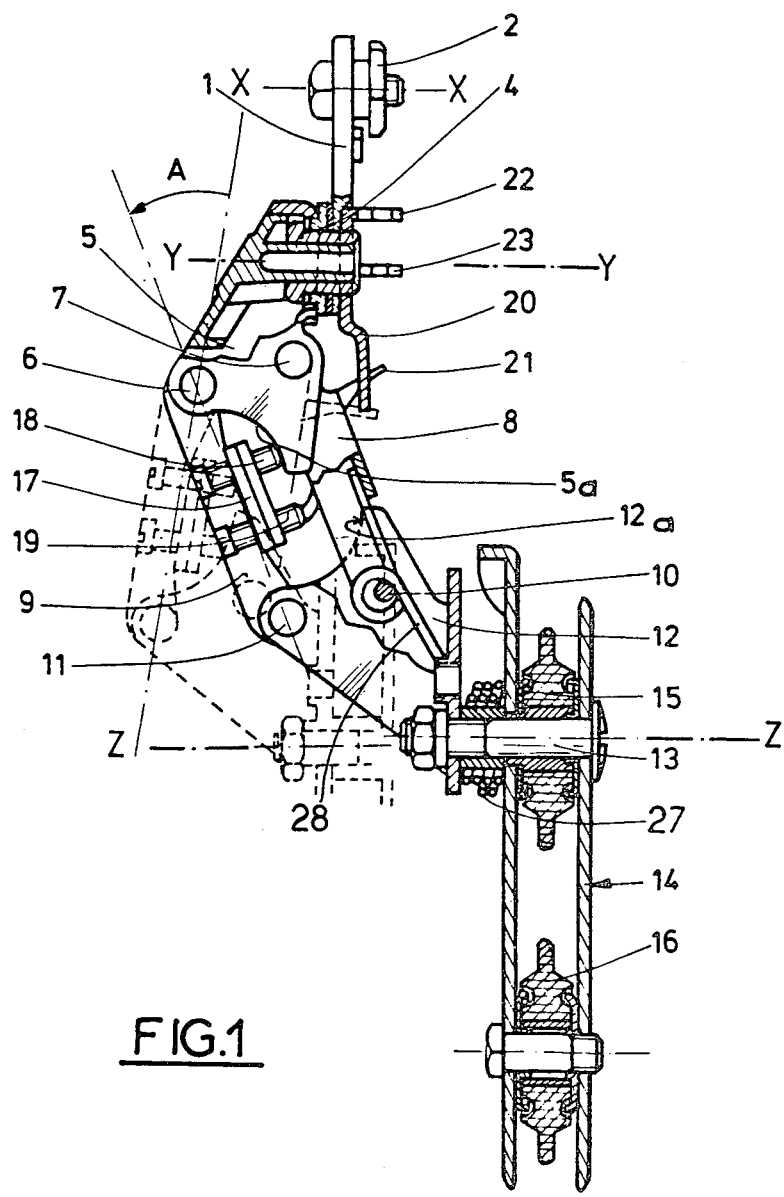
FIG. 1 is a front end elevational view, partly cut away, of one embodiment of the invention.
Figures 2, 3:
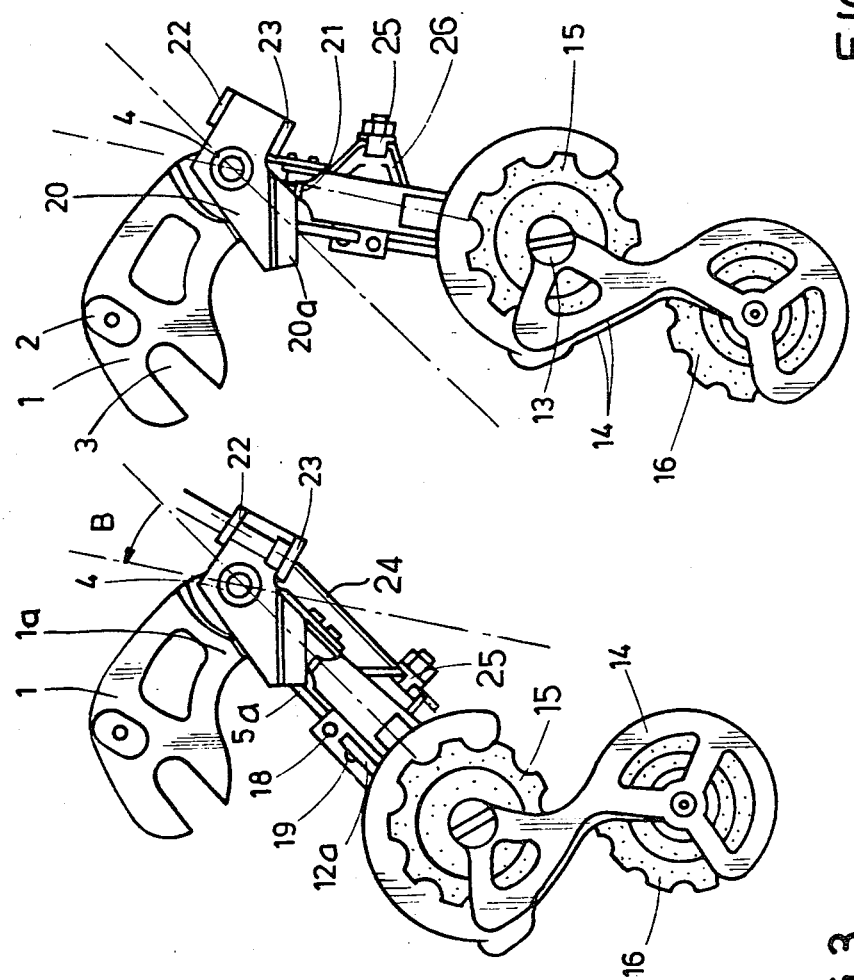
FIG. 2 is a view of the right side of FIG. 1.
FIG. 3 is a view corresponding to FIG. 2, the derailleur being shown in another pivoted position.

The derailleur shown in FIGS. 1 to 3 comprises a lug or support 1, adapted to be fixed to the rear fork of a cycle by means of a locking screw 2, the notch 3 of this lug being moreover disposed around the spindle of the free wheel.

Pivoted on this lug 1 by means of a pin 4 is a side member 5 which defines by the two pins 6 and 7 one of the sides of a deformable parallelogram structure whose opposite side to which it is connected by two arms 8 and 9 and two articulations 10 and 11, is constituted by a side member 12 which supports, on a pin 13, a yoke 14 receiving between its two branches a chain guide roller 15 and a chain tension roller 16.

The arm 9 of the deformable parallelogram structure has a lug 17 provided with two screws 18 and 19 which are adapted to allow the adjustment of the two end positions of the deformable parallelogram structure by bearing against the extensions 5a and 12a of the side members 5 and 12 of the parallelogram structure.

According to the invention, a lug 20 is mounted to rotate about the pin 4 ensuring the pivotal mounting of the member 5 on the lug 1, this lug 20 having a lower cam edge or surface 20a which cooperates with a finger member 21 provided on the arm 8 of the deformable parallelogram structure and with an abutment 1a of the lug 1.

Moreover, this lug 20 has two flanges 22 and 23 which allow the passage of the traction cable 24 and act as an abutment for the sheath thereof, the end of this cable being hooked at 25 by means of a screw on a lug 26 formed on the arm 9 of the deformable parallelogram structure. A spring 27 provides the tension on the chain and a spring 28 placed around the pin 10 biases the articulated parallelogram structure in opposition to the action of the traction cable.

This derailleur operates in the following manner:

When the derailleur occupies the position shown in FIG. 3, which corresponds to the position shown in dotted lines in FIG. 1, the chain of the cycle which is guided by the roller 15 is in engagement with the sprocket of the smallest diameter of the free wheel.

This position is determined by the abutment of the screw 19 against the extension 12a of the member 12.

When a pull is exerted on the cable 24, the deformable parallelogram structure pivots in the direction of arrow A until the screw 18 bears against the extension 5a of the member 5.

This position corresponds to that shown in FIG. 2 and shown in full lines in FIG. 1.

In this case, the chain guide roller 15 has moved in order to place the chain on the sprocket of the largest diameter of the free wheel.

However, in the course of this pivoting in the direction of arrow A, the finger member 21 has moved against the cam surface or ramp 20a of the lug 20, it being maintained thereagainst owing to the fact that the chain is constantly maintained under tension by the spring 27, acting between the member 12 and the yoke 14.

Thus it will be seen that during the pivoting of the parallelogram structure in the direction of arrow A, this derailleur pivots about the pin 4 in the direction of arrow B (FIG. 3), which shifts the chain guide roller 15 in a plane which is roughly parallel to a plane tangent to the free wheel so that the length of the chain portion located between the chain guide roller 15 and the free wheel is constantly as short as possible irrespective of the sprocket of the free wheel employed.

It will be observed that this embodiment, which is extremely simple since it employs only a finger member 21 and a lug 20, ensures a precise control of the yoke 14 of the derailleur, bearing in mind that the finger member 21 is constantly maintained applied against the ramp 20a by the tension of the chain.

Further, this embodiment permits an easy disassembly of the rear wheel since it is easy to pivot the derailleur by hand in the direction of arrow B by at the same time driving in rotation the lug 20 which, in normal operation, bears against the abutment 1a formed on the lug 1.

It will moreover be observed that this pivoting of the derailleur about the pin 4 is not liable to bend and consequently harm the traction cable since the latter is guided by the extensions 22 and 23 of the lug 20 which is driven simultaneously.

Figure 4:
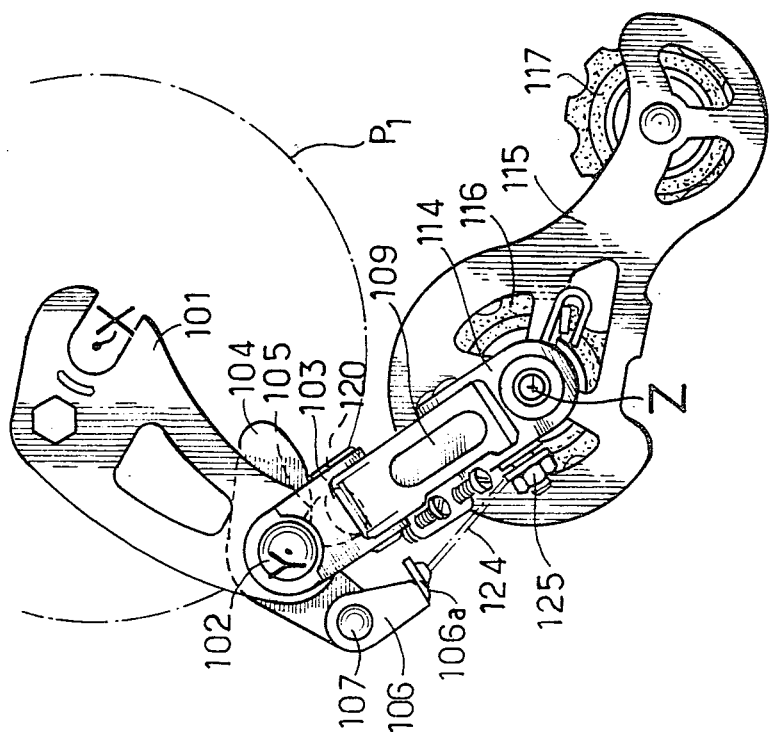
FIG. 4 is a side elevational view of a modification of the derailleur in one of its end positions.

The derailleur shown in FIGS. 4 to 7 comprises on the whole the same component parts as that described hereinbefore. Thus, there are found a support lug or support 101 fixed to the frame (not shown) and with which are rigid, on one hand, a pin 102 (Y—Y) about which a member 103 is pivotally mounted, this member constituting one of the side members of an articulated parallelogram structure and, on the other hand, a member 104. The latter defines by its lower edge a cam surface 105 whose profile will be described hereinafter and carries, in its upper part, an abutment 106 for guiding the cable, this abutment being pivoted at 107 (FIG. 4).

The articulated parallelogram structure is completed by two lateral arms 108, 109 which are pivoted at 110 and 111 to the member 103 and at 112, 113 to the member 114 which constitutes the fourth side member of this parallelogram structure. The member 114 acts as a support for a yoke 115 on which are disposed the chain guide roller 116 and chain tension roller 117. In the known manner, this yoke is biased to the tensioning position by a torsion spring 118.

The arm 108 carries a lateral finger member 119 which is disposed roughly perpendicular to the face thereof facing the wheel and on which there is rotatably mounted a roller 120 of frustoconical or part-spherical shape. This roller is guided along the cam surface 105.

Two adjustable abutment screws 121a–121b are also provided, these screws determining the two end positions of the movement of the parallelogram structure, which come in contact respectively with bearing surfaces 122, 123 provided on the members 103 and 114.

Figure 7:
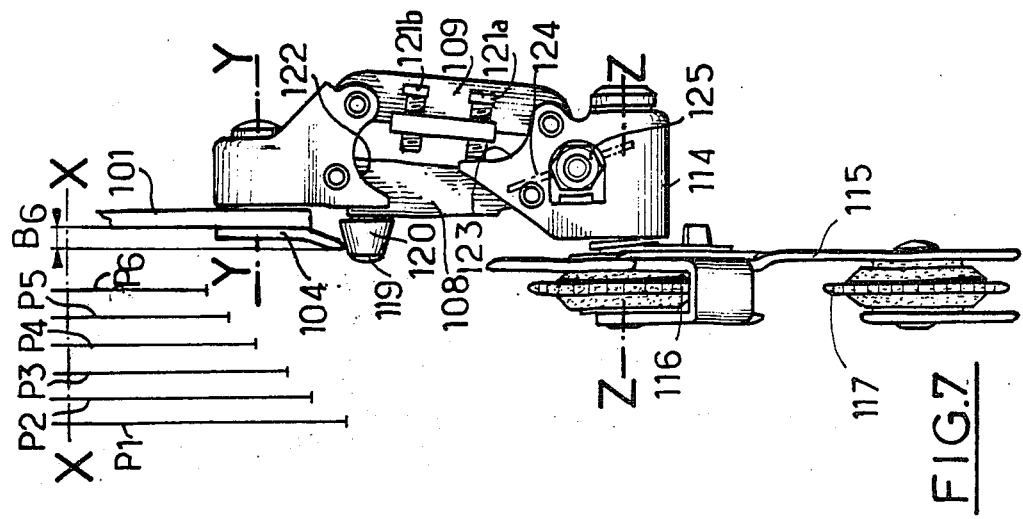
FIGS. 6 and 7 are views similar to FIGS. 4 and 5 showing the derailleur in its other end position.

The cable 124 for shifting the derailleur is fixed by a cable clamp 125 carried by the member 114, and the member 106 acting as an abutment for the sheath of this cable defines a lug 106a which is inwardly offset, i.e. toward the wheel, relative to the side of the support lug of the derailleur so that, when it is actuated from the position thereof shown in FIG. 7, the parallelogram structure is biased rearwardly and laterally toward the interior which facilitates its displacement.

The axis of the wheel is designated by the reference X—X and the sprockets of the free wheel, here six sprockets, carry the references $P_1$ to $P_6$. The member 103 is pivotally mounted on its support 101 to pivot about an axis Y—Y parallel to the axis X—X. Z—Z designates the axis of the chain guide roller 116.

The profile of the cam surface 105 is adapted to obtain a tridimensional camming action of the roller or, in other words, this cam has a camming profile in three dimensions as shown in FIGS. 4 to 7. Its profile is so chosen as to achieve an optimal positioning of the articulated parallelogram structure 103, 108, 109, 114 and consequently of the chain guide roller 116 relative to the various sprockets of the wheel. Indeed, when changing from one gear ratio to the other, the articulated parallelogram structure undergoes, on one hand, a bodily displacement about the axis Y—Y of articulation to the support lug, and, on the other hand, a deformation, these two movements being determined by the abutment of the roller 120 on its guide cam 105.

Figure 5:
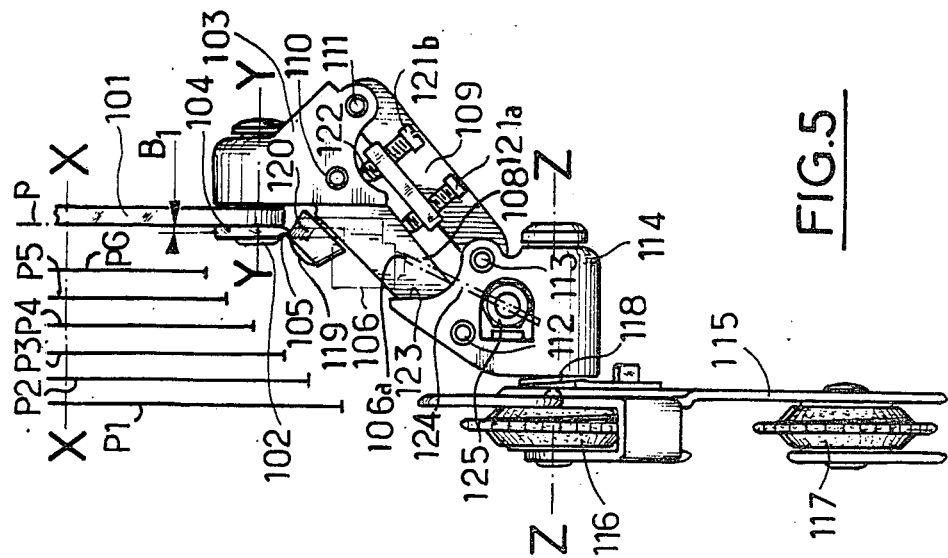
FIG. 5 is a rear end view showing the derailleur in the position thereof of FIG. 4, some parts having however been angularly displaced for reasons of clarity.
Figure 6:
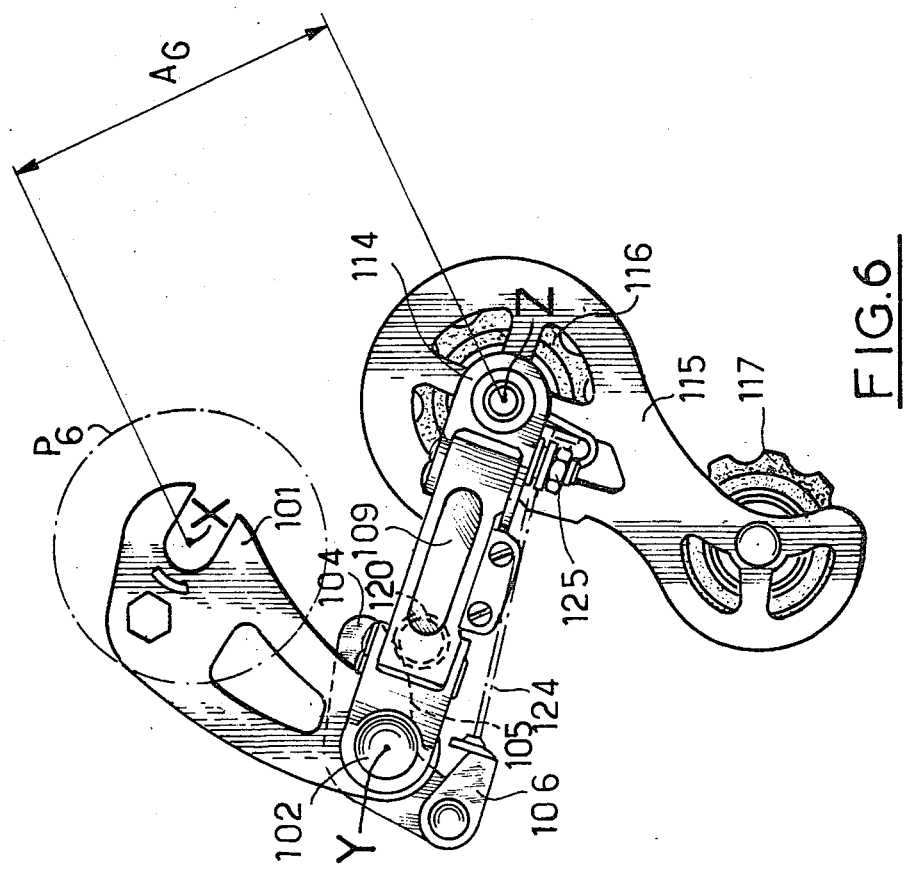

By way of example, there will be explained hereinafter the shape of the profile of a cam employed for a derailleur for six speeds, the free wheel sprockets comprising respectively fourteen, sixteen, nineteen, twenty-two and twenty-eight teeth. This profile is defined by its shape projected onto a reference plane perpendicular to the axis X—X of the wheel and by the distance between each of its points and this reference plane which may be formed by the plane P containing the inner face of the support 101. The projection of the cam 105 on the plane P is shown in FIGS. 5 and 6 and on FIG. 8. In the latter, the points $Z_1 \ldots Z_6$ represent the positions of the axis of the chain guide roller 116 for the different gear ratios, it being possible to represent these positions in polar coordinates by the angles $\beta_1 \ldots \beta_6$ and by the distances $A_1 \ldots A_6$, as shown in FIG. 5. The positions in the reference plane of the centre of the chain guide roller being thus defined, the projection of the roller 120 is deduced therefrom and the projection of the cam 105 constitutes the envelop of the projections of the section of the roller in which is located the point of contact with the cam. These different sections of the roller are shown in FIGS. 9 to 14. Preferably, the contact between the roller and the cam occurs always along the same circle 130 of the roller so as to avoid frictions in the axial direction.

The third coordinate which is useful for determining the profile of the cam 105 is the distance to the reference plane P and the values $B_1 \ldots B_6$ correspond to this distance for the six characteristic points of this cam (points of contact with the roller for the six positions of the derailleur).

The following table gives the values of the angles $\beta_1 \ldots \beta_6$, the radii $A_1 \ldots A_6$, and the dimensions $B_1 \ldots B_6$. It also shows:

the distances $C_1 \ldots C_6$ between, in projection on the plane P, the traces $Z_1 \ldots Z_6$ of the axis Z, and the centres $G_1 \ldots G_6$ of the section of the roller 120;

the distances $D_1 \ldots D_6$ from the median planes of the sprockets to the reference plane P;

the distances $E_1 \ldots E_6$ between the axis X—X and the axis Z—Z of the chain guide roller, from which can be deduced the values of the functional gap $F_1 \ldots F_6$ between the chain guide roller and the sprocket by subtracting the radius of the chain guide roller and the pitch radius of the sprocket;

the values $\alpha_1 \ldots \alpha_6$ of the angle that the straight line X-Z makes with the vertical.

| Speeds | $\alpha$ in degrees | $\beta$ in degrees | A in mm | B in mm | C in mm | D in mm | E in mm | F in mm |
|---|---|---|---|---|---|---|---|---|
| 1 | −5 | 34.35 | 59.15 | 0.95 | 52.5 | 41 | 90.26 | 13 |
| 2 | 3.77 | 46.22 | 64.98 | 2.6 | 56.01 | 35.4 | 86.23 | 15.02 |
| 3 | 10.60 | 54.84 | 68.96 | 3.63 | 57.77 | 29.8 | 82.2 | 17.06 |
| 4 | 16.27 | 61.73 | 71.70 | 4.21 | 58.39 | 24.2 | 78.17 | 19.05 |
| 5 | 21.03 | 67.49 | 73.45 | 4.46 | 58.08 | 18.6 | 74.14 | 21.05 |
| 6 | 25.00 | 72.42 | 74.34 | 4.4 | 56.96 | 13 | 70.1 | 21.06 |

The fact of using a cam profile having three dimensions permits obtaining a particularly precise and advantageous positioning of the chain guide roller. This is clear in particular from the values of the functional gap F which varies within small proportions, notwithstanding the very different numbers of teeth of the two end sprockets $P_1$ and $P_6$. This variation is in particular much more regular than in a derailleur of conventional construction. Further, it is possible by suitably choosing the relative positions of the axes X—X and Y—Y and the position of the roller 120 and by consequently determining the profile of the cam 105, to obtain a roughly constant operational gap F. However, this requires great length for the fixing lug 101 and has not been used in the illustrated embodiment for reasons of appearance. The advantage mentioned before is particularly noticeable when passing onto the sprockets of smaller diameter.

Further, the fact of achieving this guiding by using a roller rotatably mounted on a finger member carried by the arm of the parallelogram structure reduces friction to a minimum and ensures a particularly reliable and precise operation of the derailleur. This reduction in friction enables the force exerted by the return spring to be decreased, this spring being usually provided for biasing the articulated parallelogram structure toward its position shown in FIG. 7. This spring may even be completely eliminated as shown in the embodiment shown in the drawing since the tension exerted on the chain is sufficient to bias the parallelogram structure to the desired position by the bearing of the roller on its guide cam and the absence of resistance in this region. This elimination of the spring facilitates the assembly operations which may be easily automatized.

Another surprising advantage resides in the possibility of pre-selecting the speed which is only engaged when the user drives the chain.

Note also that the number of component parts of this derailleur is small relative to the number of known devices which seek to obtain the same results but whose construction is substantially more complicated.

Having now described my invention what I claim as new and desire to secure by Letters Patent is:

1. A derailleur for a cycle chain and sprockets on a wheel of a cycle having an axis of rotation, the derailleur comprising a support for fixing on a frame of the cycle, a deformable parallelogram structure, a traction cable connected to the parallelogram structure for deforming said structure, the parallelogram structure comprising a first side member mounted on the support to pivot about a first axis, a second side member opposed to said first side member, and a first arm and a second arm opposite the first arm, the first and second side members and the first and second arms being pivotally interconnected so that the parallelogram structure is deformable substantially in a first plane substantially parallel to said first axis, a yoke provided with a chain guide roller and a chain tensioning roller and mounted on said second side member to pivot about a second axis substantially parallel to said first axis, means for elastically biasing the yoke relative to said second side member in a direction about said second axis for tensioning the chain, a finger member carried by one of said arms, and means defining a cam surface carried by the support and cooperative with the finger member for guiding the finger member and the parallelogram structure and causing said plane of the parallelogram structure to pivot about said first axis toward the axis of rotation of the wheel of the cycle when changing up the gear speeds.

2. A derailleur as claimed in claim 1, wherein the means defining the cam surface comprises a member pivotally mounted on the support, and an abutment is cooperative with said member defining the cam surface for holding said member defining the cam surface stationary for cooperation with said finger member.

3. A derailleur as claimed in claim 2, wherein the pivot axis of the member defining the cam surface coincides with said first axis.

4. A derailleur as claimed in claim 2, wherein the member defining the cam surface carries an abutment for a sheath of the traction cable.

5. A derailleur as claimed in claim 4, wherein said abutment for the sheath of the traction cable is offset toward the wheel relative to a fixing point of the cable on the parallelogram structure.

6. A derailleur as claimed in claim 4, wherein said abutment is defined by a lug pivotally mounted on an extension of the member defining the cam surface.

7. A derailleur for a cycle chain and sprockets on a wheel of a cycle having an axis of rotation, the derailleur comprising a support for fixing on a frame of the cycle, a deformable parallelogram structure, a traction cable connected to the parallelogram structure for deforming said structure, the parallelogram structure comprising a first side member mounted on the support to pivot about a first axis, a second side member opposed to said first side member, and a first arm and a second arm opposite the first arm, the first and second side members and the first and second arms being pivotally interconnected so that the parallelogram structure is deformable substantially in a first plane substantially parallel to said first axis, a yoke provided with a chain guide roller and a chain tensioning roller and mounted on said second side member to pivot about a second axis substantially parallel to said first axis, means for elastically biasing the yoke relative to said second side member in a direction about said second axis for tensioning the chain, a finger member carried by one of said arms, means defining a cam surface carried by the support and cooperative with the finger member for guiding the finger member and the parallelogram structure and causing said plane of the parallelogram structure to pivot about said first axis toward the axis of rotation of the wheel of the cycle when changing up the gear speeds, the cam surface having a profile which has a tridimensional camming action on the finger member, and means for reducing friction between the finger member and the cam surface.

8. A derailleur as claimed in claim 7, wherein said friction-reducing means comprise a roller which is rotatably mounted on the finger member.

9. A derailleur as claimed in claim 8, wherein the roller has a frustoconical shape.

10. A derailleur as claimed in claim 8, wherein the roller has a part-spherical shape.

11. A derailleur as claimed in claim 7, wherein the profile of the cam surface is such that the point of contact with the finger member is always in the same transverse section of the finger member.

12. A derailleur as claimed in any one of the claims 7 to 11, comprising means for biasing the articulated parallelogram structure towards an end position thereof corresponding to the smallest sprocket of said sprockets under the effect of the tension of the chain.

* * * * *